United States Patent [19]

Wahl, Jr.

[11] 4,237,703
[45] Dec. 9, 1980

[54] MAGNETIC GOVERNOR DRIVE COUPLING

[75] Inventor: Thomas V. Wahl, Jr., North Pekin, Ill.

[73] Assignee: Caterpillar Tractor Co., Peoria, Ill.

[21] Appl. No.: 950,637

[22] Filed: Oct. 12, 1978

[51] Int. Cl.³ .................... F16D 7/00; H02K 49/00
[52] U.S. Cl. ................................ 64/28 M; 64/1 V;
  310/103; 310/75 D; 192/84 PM
[58] Field of Search .............. 64/1 V, 28 M, 27 R;
  310/103, 75 D, 74; 192/84 PM, 71

[56] References Cited

U.S. PATENT DOCUMENTS

| | | | |
|---|---|---|---|
| 1,171,351 | 2/1916 | Neuland | 310/103 |
| 1,962,659 | 6/1934 | Kautz | 310/103 |
| 2,344,111 | 3/1944 | Ryba | 192/84 |
| 2,444,797 | 7/1948 | Williams | 310/103 |
| 3,267,310 | 8/1966 | Ireland | 310/103 |
| 3,301,091 | 1/1967 | Reese | 310/103 |
| 3,556,270 | 1/1971 | Comment | 192/3 |
| 3,924,585 | 12/1975 | Woods | 192/82 T |

Primary Examiner—Ira S. Lazarus
Assistant Examiner—Magdalen Moy

Attorney, Agent, or Firm—Wegner, Stellman, McCord, Wiles & Wood

[57] ABSTRACT

A drive assembly for connecting a governor (10) to an engine (12) for absorbing torsional vibrations in the shaft while providing a direct drive between the engine and the governor during overtravel. The drive assembly includes a shaft (16) driven by the engine (12) and a rotor (24) mounted on the end of the shaft and received within a housing (18) mounted for rotation about the shaft. The housing contains magnets (35 and 37) which interact with magnetically permeable portions of the rotor (24) to establish a magnetic flux coupling therebetween. During operation, torsional vibrations in the drive shaft (16) will tend to rotate the rotor (24) relative to the housing (18), thereby reducing the torsional vibration imparted from the engine (12) to the governor (10). Pins (32 and 34) limit the amount of relative movement between the rotor and the housing so that the rotor engages the pins, providing the direct drive to the governor during overtravel. The housing includes a gear (20) mounted about its circumference for driving a pinion (22) leading to the governor (10).

4 Claims, 4 Drawing Figures

U.S. Patent        Dec. 9, 1980        4,237,703
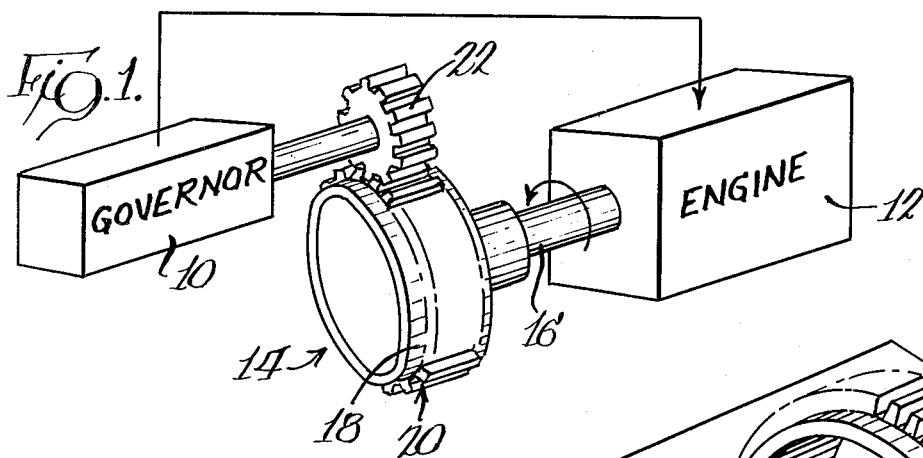
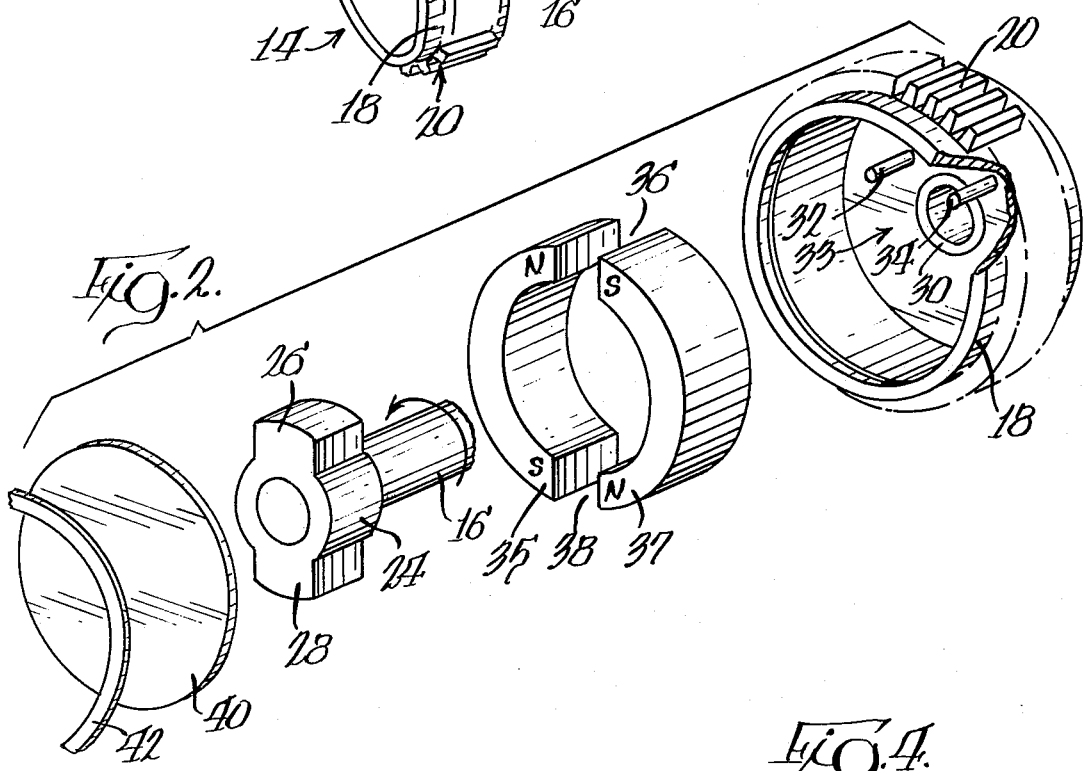
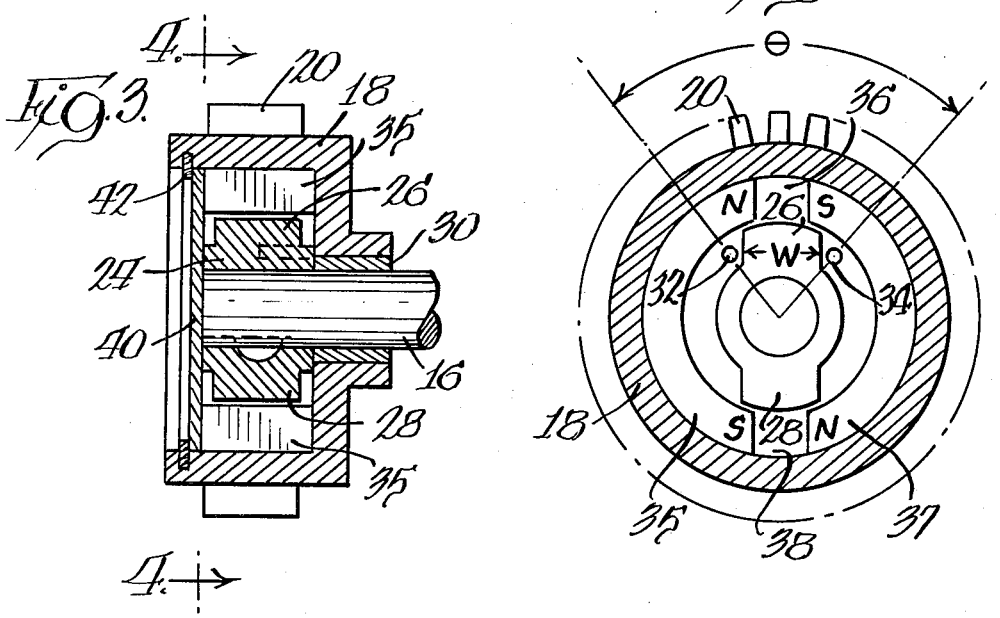

4,237,703

MAGNETIC GOVERNOR DRIVE COUPLING

TECHNICAL FIELD

This invention relates to a drive assembly for a mechanical element and, more particularly, to an improved drive from an engine to an associated governor.

BACKGROUND ART

Often there is a significant amount of torsional vibration in a drive train leading from an engine, as a diesel engine, to its governor. Excessive torsional vibrations adversely affect the operation of the governor which in turn causes the engine to operate erratically. The oscillatory vibrations in the governor drive must be reduced or eliminated for satisfactory governor and engine operation.

Various mechanical linkages have been proposed in an attempt to reduce or eliminate the torsional oscillations between the drive train and the engine governor. However, direct drive systems with a plurality of gears usually experience the problem referred to as backlash, which results from machining tolerances allowing for imperfectly located gear centers and machined gear tooth profile. Backlash causes undesirable torsional vibrations, and the problem becomes more significant as the number of gears in the drive is increased and as the drive and power or load requirements change. Moreover, a mechanical drive specifically designed for driving a governor with no torsional vibrations in one engine may not be useful for other engines or their applications.

DISCLOSURE OF INVENTION

In one aspect of the present invention, a drive assembly is provided for driving a mechanical element from a drive shaft having a rotor mounted on one end thereof. The assembly has a housing mounted for rotation about the shaft with the rotor being enclosed in the housing. Members, as pins or stops, are provided for permitting only a selected degree of relative rotational motion between the rotor and the housing. A flux coupling established between the magnetic elements and the rotor align the rotor between the stops or pins during rotation. Only a selected degree of relative rotational motion between the rotor and the housing during rotation of the drive shaft is permitted by the placement of the stops. The housing is provided with means for driving the mechanical element.

According to the present invention, a drive assembly employs, in part, a magnetic coupling to reduce the torsional oscillations between an engine and its governor. In the event that the amplitude of the vibration from the drive train to the governor exceeds an established angular displacement of the magnetic coupling, as during overtravel, a positive drive from the engine to the governor is provided until the amplitude of the vibration decreases to a level less than the established angular displacement of the coupling.

BRIEF DESCRIPTION OF DRAWINGS

FIG. 1 is a perspective view, partly in schematic form, of a drive assembly in accordance with an embodiment of the present invention.

FIG. 2 is an exploded perspective view of the drive assembly shown in FIG. 1.

FIG. 3 is a cross-sectional view of the drive assembly of FIG. 2.

FIG. 4 is an end view of the drive assembly shown in FIG. 3.

BEST MODE FOR CARRYING OUT THE INVENTION

Referring to FIG. 1 of the drawings, governor 10 is coupled to engine 12 by drive assembly 14. A housing 18 is mounted for rotation about shaft 16 and has an annular gear 20 for driving pinion 22 and thereby governor 10. As will be discussed in detail below, variations in the amplitude of the torsional vibrations on shaft 16 are not imparted to pinion 22 as long as the amplitude is less than a selected amount. However, if the amplitude of the torsional vibrations exceeds the selected amount as established by an angular displacement of a magnetic coupling within housing 18, a direct drive connection is provided to governor 10 from engine 12.

Torsional vibrations in the drive shaft tend to rotate the rotor relative to the housing. These vibrations are resisted by the flux coupling between the rotor and the magnets. The resistive magnetic force of the flux coupling tends to become greater as the gap between the rotor and housing decreases. The magnetic flux density varies proportionately with the angular displacement of the rotor relative to the housing. Thus the varying magnetic flux density of the magnetic coupling, which is proportional to torsional amplitude, acts as a magnetic spring between the rotor and housing. Stops are necessary to prevent overtravel which would allow contact of the rotor and housing and for providing direct drive when the angular displacement of the magnetic coupling is exceeded.

Referring to FIGS. 2-4, the drive assembly 14 will now be described. A metal rotor 24, which may be in the form of a bar-shaped rotor, is suitably attached to drive shaft 16. The rotor 24 has opposed outwardly extending flanges 26 and 28 which are made of magnetically permeable material, such as soft iron, ceramic magnets, and the like. Although only two opposed flanges are shown, it will be apparent that the number of projections, as flanges 26 and 28, are selected in accordance with the desired configuration of the magnetic coupling. The rotor 24 is received and retained within housing 18 by bearing 30.

Housing 18 is mounted for rotation about shaft 16 and has spaced-apart stop pins 32 and 34 secured in an end wall 33. The pins 32 and 34 are substantially parallel to each other and to the axis of shaft 16 and form an angle $\theta$ therebetween wherein the vertex of the angle is coincident with the axis of shaft 16. The magnitude of angle $\theta$ is selected in accordance with the circumferential width W of the flange 26 (FIG. 4), thereby defining the selected angular displacement of the rotor 24 with respect to the housing 18.

Housing 18 has fixed therein two similar arcuately-shaped magnets 35 and 37 facing each other within the housing and defining gaps or spaces 36 and 38 therebetween. The magnets are arranged so that a magnetic polarity exists on one side of each space 36 and 38, and an opposite magnetic polarity exists on the other side of each said space 36 and 38 to provide a magnetic field having lines of magnetic flux therebetween. As a result of the flux coupling, flange 26 on the rotor 24 tends to align itself across the space or gap 36, and flange 28 tends to align itself across the space or gap 38. This alignment is hereinafter referred to as the rest position.

The flanges 26,28 of the rotor may be made of magnetically excitable metal (soft iron) or may be magnetic material, such as a ceramic magnet, which will have poles opposite to the adjacent poles on the magnets 35,37, such that the poles on the magnets 35,37 are magnetically opposite to the magnetic poles on the rotor to attract each other in coupling relationship.

A cover 40 is retained in housing 18 by a snap ring 42, thereby defining an enclosed volume within the housing which can be filled with a liquid if desired. The liquid can be of many forms including a suspension of magnetic particles for improving the damping characteristics between the rotor and the housing.

INDUSTRIAL APPLICABILITY

The operation of the drive assembly 14 will now be described. Engine 12 imparts vibrational energy to shaft 16 and rotor 24 rotates with respect to housing 18, but said rotation is resisted by the magnetic flux acting on rotor 24. As the rotational position of the rotor 24 relative to the housing 18 increases from the rest position, the flux coupling therebetween becomes stronger, tending to reduce torsional vibrations between drive shaft 16 and gear 20. When housing 18 and shaft 16 are rotating at the same speed and there is no vibrational energy imparted, rotor 24 is in the rest position.

Assuming that the shaft 16 is rotating in a clockwise direction from startup, flange 26 on rotor 24 may engage stop pin 32 if the magnetic flux density is insufficient to retain flange 26 between pins 32 and 34. As the speed of the shaft becomes more closely equal to that of the housing, the magnets 35 and 37 tend to align the flanges 26 and 28 on the rotor 24 so that the flanges are located between pins 32 and 34. This permits the torsional vibration to be absorbed by the relative movement of the flange 26 between the pins 32 and 34. If the vibrations are of large amplitude, flange 26 will engage either pin 32 or 34 thus provided a direct mechanical link between the engine 12 and the governor 10 and preventing the rotor from contacting the housing due to overtravel.

It is apparent that although only one set of pins is shown, a second set of pins could also be provided on each side of flange 28. Moreover, it is apparent that the pins 32 and 34 need not necessarily be equally spaced from the edges of gaps 36 and 38. If the pins are unequally spaced with respect to the end portions of gap 36 or gap 38, the assembly will absorb larger torsional vibrations in one direction than in the other. It is also apparent that the larger torsional vibrations are damped as the angle $\theta$ is increased.

Other aspects, objects and advantages of this invention can be obtained from a study of the drawings, the disclosure and the appended claims.

What is claimed is:

1. A drive assembly for driving a mechanical element from a drive shaft comprising:
   a drive shaft (16);
   a rotor (24) mounted on an end of the shaft and having two portions of magnetically permeable material thereon;
   a housing (18) mounted for rotation about said shaft, said housing encircling said rotor;
   pin means (32,34) carried by said housing (18) and positioned on opposite sides of said rotor (24) for permitting only a selected degree of relative rotational motion between said rotor and said housing;
   magnet means (35,37) for aligning said rotor (24) between said pin means (32,34), said magnet means includes two arcuately-shaped magnets (35,37) carried by said housing, each magnet having two concentrically-shaped faces, a front and a rear face, and two end faces, the end faces of one of said magnets being spaced from the end faces of the other of said magnets to define spaces (36,38) therebetween, said portions of magnetically permeable material on said rotor aligning with said spaces (36,38) between said magnet means (35,37); and
   means (20) on said housing for driving said mechanical element.

2. A drive assembly for driving a mechanical element from a drive shaft comprising:
   a drive shaft (16);
   a rotor (24) mounted on an end of the shaft and having opposed flanges (26,28) thereon;
   a housing (18) mounted for rotation about said shaft, said housing encircling said rotor;
   pin means (32,34) carried by said housing (18) and positioned on opposite sides of said rotor (24) for permitting only a selected degree of relative rotational motion between said rotor and said housing;
   magnet means (35,37) for aligning said rotor (24) between said pin means (32,34), said magnet means includes two arcuately-shaped magnets (35,37) carried by said housing, each said magnet having planar end faces with the end faces on one of said magnets lying parallel to and being spaced from the end faces on the other of said magnets and defining spaces (36,38) therebetween; and
   said opposed flanges (26,28) on said rotor aligning with said spaces (36,38) between said end faces of the magnet means (35,37) during rotation of said drive shaft (16) and said housing (18).

3. The drive assembly of claim 2 wherein at least one of said flanges (26,28) engages at least one of said pins (32,34) when torsional vibration exceeds a selected amount.

4. A drive assembly for driving a mechanical element from a drive shaft comprising:
   a drive shaft (16);
   a rotor (24) mounted on an end of the shaft and having opposed flanges (26,28) thereon;
   a housing (18) mounted for rotation about said shaft, said housing encircling said rotor;
   pin means (32,34) carried by said housing (18) and positioned on opposite sides of said rotor (24) for permitting only a selected degree of relative rotational motion between said rotor and said housing;
   magnet means (35,37) for aligning said rotor (24) between said pin means (32,34), said magnet means includes two arcuately-shaped magnets (35,37) carried by said housing, each said arcuately-shaped magnet having planar end faces on the opposite ends thereof, the end faces of said magnets being spaced from each other and defining spaces (36,38) therebetween; and
   each said opposed flange (26,28) on said rotor aligns with one of said spaces (36,38) between said end faces of said magnet means during rotation of said drive shaft.

* * * * *